(12) United States Patent
Okita et al.

(10) Patent No.: US 8,416,504 B2
(45) Date of Patent: Apr. 9, 2013

(54) OPTICAL DEVICE AND HOUSING

(75) Inventors: Hiroyuki Okita, Tokyo (JP); Miki Tsuchiya, Tokyo (JP); Yuichi Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 151 days.

(21) Appl. No.: 13/081,696

(22) Filed: Apr. 7, 2011

(65) Prior Publication Data

US 2011/0255175 A1 Oct. 20, 2011

(30) Foreign Application Priority Data

Apr. 16, 2010 (JP) ................ P2010-095159

(51) Int. Cl.
*G02B 1/06* (2006.01)
*B32B 9/04* (2006.01)

(52) U.S. Cl.
USPC .......................... 359/665; 359/666; 428/411.1

(58) Field of Classification Search ................... 359/665, 359/666; 428/1.5, 411.1
See application file for complete search history.

(56) References Cited

U.S. PATENT DOCUMENTS

| | | | | |
|---|---|---|---|---|
| 6,842,288 B1 * | 1/2005 | Liu et al. | | 359/586 |
| 7,738,194 B2 * | 6/2010 | Choi et al. | | 359/811 |
| 7,853,139 B2 * | 12/2010 | Tsuchiya | | 396/175 |
| 8,081,389 B2 * | 12/2011 | Kirita et al. | | 359/665 |

FOREIGN PATENT DOCUMENTS

| | | |
|---|---|---|
| JP | 2000-356708 | 12/2000 |
| JP | 2002-162507 | 6/2002 |

\* cited by examiner

*Primary Examiner* — David N Spector
(74) *Attorney, Agent, or Firm* — K&L Gates LLP

(57) ABSTRACT

An optical device includes a first substrate which is transparent to incident light, a second substrate which is transparent to incident light, and a frame member which connects the first substrate to the second substrate. A lens chamber surrounded by the first substrate, the second substrate, and the frame member is filled with first and second liquids constituting a liquid lens. A region composed of an inorganic material and a region composed of an organic material coexist in the inner surface of the first substrate and the inner surface of the frame member. A first insulating layer composed of an inorganic material, an adhesion layer composed of an organic material, and a second insulating layer composed of an organic material are stacked in that order on the inner surface of the first substrate and the inner surface of the frame member.

7 Claims, 6 Drawing Sheets

OPTICAL DEVICE AND HOUSING

CROSS REFERENCES TO RELATED APPLICATIONS

The present application claims priority to Japanese Priority Patent Application JP 2010-095159 filed in the Japan Patent Office on Apr. 16, 2010, the entire contents of which are hereby incorporated by reference.

BACKGROUND

The present application relates to an optical device utilizing an electrowetting phenomenon, and a housing constituting such an optical device.

In recent years, optical devices utilizing an electrowetting phenomenon (electrocapillarity) have been under development. The term "electrowetting phenomenon" refers to a phenomenon in which, when a voltage is applied between a conductive liquid and an electrode, energy at the solid-liquid interface between the surface of the electrode and the liquid changes, resulting in a change in the shape of the surface of the liquid.

FIGS. 6A and 6B are views illustrating the principle of the electrowetting phenomenon. As schematically shown in FIG. 6A, for example, it is assumed that an insulating layer 102 is disposed on the surface of an electrode 101, and a conductive droplet 103 of an electrolytic solution is placed on the insulating layer 102. The surface of the insulating layer 102 has been subjected to water repellency treatment. As shown in FIG. 6A, in a state where a voltage is not applied, the interaction energy between the surface of the insulating layer 102 and the droplet 103 is low, and the contact angle $\theta_0$ is large. The contact angle $\theta_0$ is defined as the angle between the surface of the insulating layer 102 and the tangent line to the droplet 103, and depends on physical properties, such as surface tension of the droplet 103 and surface energy of the insulating layer 102.

On the other hand, as schematically shown in FIG. 6B, in a state where a voltage is applied between the electrode 101 and the droplet 103, electrolyte ions of the droplet concentrate near the surface of the insulating layer 102, resulting in a change in the amount of charge in the charge double layer, which induces a change in the surface tension of the droplet 103. This is the electrowetting phenomenon, and the contact angle $\theta_V$ of the droplet 103 changes depending on the amount of applied voltage. That is, in FIG. 6B, the contact angle $\theta_V$ can be expressed as a function of the applied voltage V according to the Lippman-Young equation (A) below.

$$\cos(\theta_V) = \cos(\theta_0) + (1/2)(\in_0 \cdot \in)/(\gamma_{LG} \cdot t) \times V^2 \quad (A)$$

where $\in_0$ is the dielectric constant of the vacuum, $\in$ is the relative dielectric constant of the insulating layer, $\gamma_{LG}$ is the surface tension of the electrolytic solution, and t is the thickness of the insulating layer.

As described above, the surface shape (curvature) of the droplet 103 changes depending on the amount of the voltage V applied between the electrode 101 and the droplet 103. Consequently, when the droplet 103 is used as a lens element, it is possible to realize an optical element in which the focal position (focal length) can be electrically controlled.

Optical devices using such an optical element have been under development. For example, Japanese Unexamined Patent Application Publication No. 2000-356708 proposes a lens array for a stroboscopic device. In the lens array, droplets of an insulating liquid which are disposed in an array on a water-repellent film on the surface of a substrate and a conductive liquid are encapsulated to constitute variable-focus lenses. In this structure, individual lenses are formed in the shape of the interface between the insulating liquid and the conductive liquid. The shape of each lens is electrically controlled by utilizing the electrowetting phenomenon so as to change the focal length. Furthermore, Japanese Unexamined Patent Application Publication No. 2002-162507 discloses a cylindrical lens constituted by a liquid lens.

SUMMARY

In general, the base for the insulating layer 102 is composed of not only the electrode 101 but also a plastic material. That is, a region composed of an inorganic material and a region composed of an organic material coexist in the base for the insulating layer 102. Meanwhile, from the standpoint of film-forming properties, in many cases, the insulating layer 102 is composed of an organic material. However, an organic material suitable for the insulating layer 102 often has poor adhesion to a region composed of an organic material and is easily separated from the region composed of an organic material in the base, which is a problem.

It is desirable to provide an optical device which utilizes an electrowetting phenomenon and which includes an insulating layer having high adhesion to a base in which a region composed of an inorganic material and a region composed of an organic material coexist, and to provide a housing constituting such an optical device.

According to an embodiment, there is provided an optical device including (a) a first substrate which is transparent to incident light, (b) a second substrate which is transparent to incident light and which opposes the first substrate, and (c) a frame member which connects the first substrate to the second substrate. A lens chamber surrounded by the first substrate, the second substrate, and the frame member is filled with a first liquid and a second liquid which constitute a liquid lens. A region composed of an inorganic material and a region composed of an organic material coexist in the inner surface of the first substrate and the inner surface of the frame member facing the lens chamber. A first insulating layer composed of an inorganic material, an adhesion layer composed of an organic material, and a second insulating layer composed of an organic material are stacked in that order on the inner surface of the first substrate and the inner surface of the frame member facing the lens chamber.

According to another embodiment, there is provided a housing including a substrate and a frame member bonded to the substrate by an adhesive layer composed of an organic material. A region composed of an inorganic material and a region composed of an organic material coexist in the inner surface of the substrate and the inner surface of the frame member facing the inside of the housing. A first insulating layer composed of an inorganic material, an adhesion layer composed of an organic material, and a second insulating layer composed of an organic material are stacked in that order on the inner surface of the substrate and the inner surface of the frame member facing the inside of the housing.

According to the embodiments of the present application, on the inner surface of a first substrate and the inner surface of a frame member which face a lens chamber and in which a region composed of an inorganic material and a region composed of an organic material coexist, or on the inner surface of a substrate and the inner surface of a frame member which face the inside of a housing and in which a region composed of an inorganic material and a region composed of an organic material coexist (hereinafter, may be collectively referred to as a "base"), a first insulating layer composed of an inorganic material and an adhesion layer composed of an organic material are stacked, and a second insulating layer composed of an organic material is disposed on the adhesion layer. In such a manner, the first insulating layer composed of an inorganic material having good adhesion to the base is formed on the base, the adhesion layer composed of an organic material having a good adhesive effect on the first insulating layer is formed thereon, and the second insulating layer composed of an organic material exhibiting good adhesion in the presence of the adhesion layer is formed. Consequently, it is possible to obtain a second insulating layer having high adhesion to the base constituted by a region composed of an inorganic material and a region composed of an organic material.

Additional features and advantages are described herein, and will be apparent from the following Detailed Description and the figures.

DETAILED DESCRIPTION

Figure 1A:
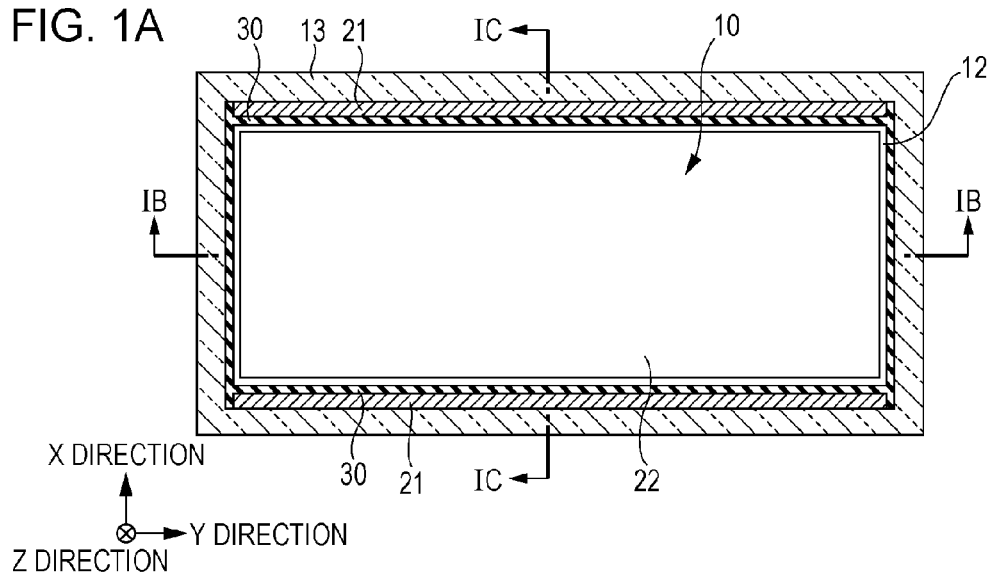
FIG. 1A is a schematic cross-sectional view of an optical device according to a first embodiment, taken along the line IA-IA in FIG. 1B.

Embodiments of the present application will be described below in detail with reference to the drawings. However, it is to be understood that the present application is not limited to the embodiments, and various numerical values and materials in the embodiments are merely for illustrative purposes. The description will be made in the following order:

1. Overall description on optical device and housing according to embodiments of the present application
2. First Embodiment (optical device and housing)
3. Second Embodiment (modification of First Embodiment) and others Overall description on optical device and housing according to embodiments of the present application In an optical device or a housing according to an embodiment (hereinafter, may be collectively simply referred to as the embodiment), examples of the organic material constituting the second insulating layer include paraxylylene-based polymers represented by structural formulae (1) to (5) below. In the case of paraxylylene-based polymers, a highly reactive monomer gas is used, and polymerization takes place at the position where the monomer gas is in contact with the adhesion layer to form a film. Therefore, it is possible to obtain a conformal second insulating layer which is pinhole-free even in microscopic regions. Thus, paraxylylene-based polymers are materials very suitable for constituting the second insulating layer. Other examples of the organic material constituting the second insulating layer include polyethylene resins, polypropylene resins, polyimide resins, epoxy resins, phenolic resins, and nylon resins. These materials are made to exhibit high adhesion in the presence of an adhesion layer composed of an organic material.

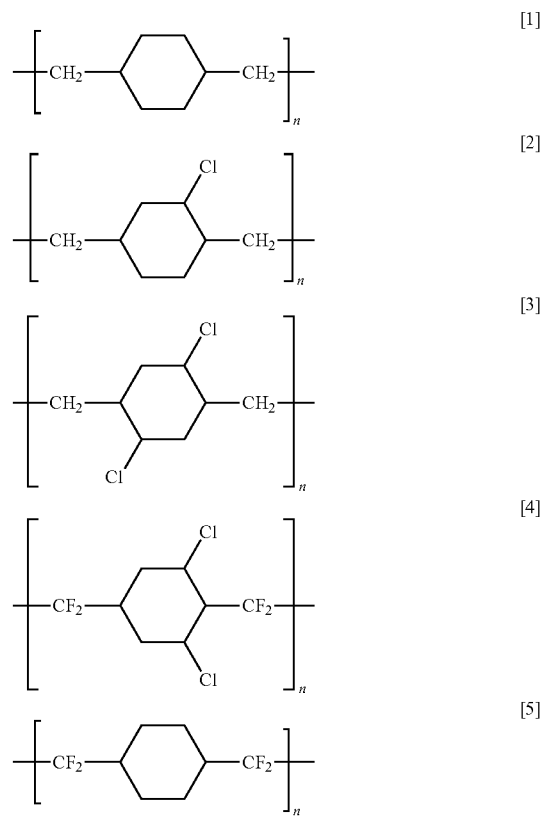

In the embodiments including the preferred embodiments of the present application, examples of the inorganic material constituting the first insulating layer include $SiO_x$-based materials including $SiO_2$, SiN, SiON, silicon oxyfluoride (SiOF), aluminum oxide ($Al_2O_3$), titanium oxide ($TiO_2$), tantalum oxide ($Ta_2O_5$), magnesium oxide (MgO), chromium oxide ($CrO_x$), zirconium oxide ($ZrO_2$), niobium oxide ($Nb_2O_5$), tin oxide ($SnO_2$), vanadium oxide ($VO_x$), $SiN_x$, AlN, TiN, TaN, CrN, ZrN, NbN, and VN. It is desirable to form (deposit) the first insulating layer by vapor deposition, such as electron beam vapor deposition or hot filament vapor deposition, or physical vapor deposition (PVD) including sputtering from the standpoint of obtaining good adhesion of the first insulating layer to the base.

Furthermore, in the embodiments including the preferred embodiments of the present application, the organic material constituting the adhesion layer can be composed of a silane coupling agent. In the case where the adhesion layer is composed of a silane coupling agent, the adhesion layer can be formed (deposited) using various coating methods and dipping methods. Such an adhesion layer can improve adhesion between the first insulating layer composed of an inorganic material and the second insulating layer composed of an organic material.

Furthermore, in the embodiments including the preferred embodiments of the present application, the first substrate and the frame member can be bonded to each other by an adhesive layer composed of an organic material, and the adhesive layer can have a portion facing the lens chamber. As the organic material constituting the adhesive layer, an organic material suitable for the materials constituting the first substrate and the frame member, which are to be bonded, can be appropriately selected. Examples thereof include epoxy adhesives, urethane adhesives, acrylic adhesives, and silicone adhesives.

Furthermore, in the optical devices according to the embodiments of the present application including the preferred embodiments, a first electrode composed of an inorganic material can be provided at least on a portion of the inner surface of the frame member, the first electrode constituting the region composed of an inorganic material, and a second electrode composed of an inorganic material can be provided on a portion of the inner surface of the second substrate facing the lens chamber. The first electrode may also be provided on a portion of the inner surface of the first substrate facing the lens chamber. In this case, the remainder of the inner surface of the frame member can constitute the region composed of an organic material.

The first electrode and the second electrode each may be a transparent electrode, depending on the region of use and desired characteristics. Examples of the material constituting the transparent electrode include conductive metal oxides, such as indium tin oxides including ITO, Sn-doped $In_2O_3$, crystalline ITO, amorphous ITO, and silver-added ITO, indium zinc oxide (IZO), $In_2O_3$-based materials including F-doped $In_2O_3$ (IFO), tin oxide-based materials including Sb-doped $SnO_2$ (ATO) and F-doped $SnO_2$ (FTO), zinc oxide-based materials including ZnO, Al-doped ZnO, B-doped ZnO, and Ga-doped ZnO, $Sb_2O_5$-based materials, $In_4Sn_3O_{12}$, InGaZnO, titanium oxide ($TiO_2$), spinel-type oxides, and oxides having a $YbFe_2O_4$ structure; metals; alloys; and semiconductor materials. Alternatively, the first electrode and the second electrode each may be an opaque electrode composed of an inorganic material, such as a metal or an alloy. Specific examples of the inorganic material include metals, such as aluminum (Al), tungsten (W), niobium (Nb), tantalum (Ta), molybdenum (Mo), chromium (Cr), copper (Cu), gold (Au), silver (Ag), titanium (Ti), nickel (Ni), cobalt (Co), zirconium (Zr), iron (Fe), platinum (Pt), and zinc (Zn); alloys containing these metal elements (e.g., MoW) or compounds containing these metal elements (e.g., nitrides, such as TiN, and silicides, such as $WSi_2$, $MoSi_2$, $TiSi_2$, and $TaSi_2$); semiconductors, such as silicon (Si); and carbon thin films, such as diamond. Examples of a method of forming the electrodes include vapor deposition, such as electron beam vapor deposition or hot filament vapor deposition, sputtering, CVD, or ion plating in combination with etching; screen printing; plating (electroplating or electroless plating); a lift-off method; laser ablation; and a sol-gel method.

Wall members (partition members) may be arranged in the lens chamber to divide the lens chamber into a plurality of regions (sections).

A configuration may be used in which the bottom surface of each wall member extends to the first substrate, and the top surface of the wall member extends to the second substrate. The term "top surface" of the wall member refers to the surface facing the second substrate, and the term "bottom surface" of the wall member refers to the surface facing the first substrate. This also applied to the description below. Alternatively, a configuration may be used in which the bottom surface of each wall member extends to the first substrate, and there is a gap between the top surface of the wall member and the second substrate. Alternatively, a configuration may be used in which there is a gap between the bottom surface of each wall member and the first substrate, and the top surface of the wall member extends to the second substrate. Alternatively, a configuration may be used in which there is a gap between the bottom surface of each wall member and the first substrate, and there is a gap between the top surface of the wall member and the second substrate. In these configurations, the wall members may be fixed to the frame member using an adhesive or the like, or the wall members and the frame member may be integrally formed.

The materials constituting the first substrate, the second substrate, and the wall member are transparent to incident light. The term "being transparent to incident light" means that the transmittance of incident light is 80% or more. Specific examples of the materials constituting the first substrate, the second substrate, the frame member, and the wall member include organic materials, such as an acrylic resin, a polycarbonate (PC) resin, an ABS resin, polymethyl methacrylate (PMMA), a polyarylate (PAR) resin, a polyethylene terephthalate (PET) resin, and a cyclo-olefin polymer (COP) resin; and inorganic materials, such as glass. The materials constituting the individual components may be the same or different. A configuration may be used in which light enters the second substrate and exits from the first substrate, or light enters the first substrate and exits from the second substrate.

In the optical devices according to the embodiments of the present application including the preferred embodiments and configurations, preferably, the first liquid and the second liquid are insoluble in and immiscible with each other, and the interface between the first liquid and the second liquid constitutes a lens surface. Furthermore, preferably, the first liquid has an insulating property, the second liquid has conductivity, and the first electrode and the second electrode are arranged such that the second electrode is in contact with the second liquid and the first electrode is insulated from the second liquid. The first electrode is in contact with the interface between the first liquid and the second liquid with the second insulating layer therebetween. Furthermore, preferably, the surface of at least a portion of the second insulating layer at which the interface between the first liquid and the second liquid is located is subjected to water repellency treatment. The water repellency treatment may be performed, for example, by a method of coating with a fluorine-based polymer, such as polyvinylidene fluoride (PVDF) or polytetrafluoroethylene (PTFE). Furthermore, a water-repellent second insulating layer may be selected.

In the optical devices according to the embodiments of the present application, examples of a liquid having conductivity (or a liquid having polarity; hereinafter, may be collectively referred to as a "conductive liquid" in some cases) include water, electrolytic solutions (aqueous solutions of an electrolyte, such as potassium chloride, sodium chloride, lithium chloride, or sodium sulfate), aqueous solutions of triethylene glycol in which these electrolytes are dissolved, alcohols having low molecular weight, such as methyl alcohol and ethyl alcohol, polar liquids, such as ambient temperature molten salts (ionic liquids), and pure water, and mixtures of these liquids. Alcohols, such as methyl alcohol and ethyl alcohol, may be used as aqueous solutions to provide conductivity or as salt solutions to provide conductivity. Furthermore, examples of a liquid having an insulating property (or a nonpolar liquid; hereinafter, may be collectively referred to as an "insulating liquid" in some cases) include nonpolar solvents containing a hydrocarbon-based material, such as decane, dodecane, hexadecane, or undecane, silicone oil, and fluorine-based materials. The conductive liquid and the insulating liquid preferably have different refractive indices and exist without mixing with each other. In addition, it is desirable to set the density of the conductive liquid and the density of the insulating liquid to be the same as much as possible. The conductive liquid and the insulating liquid are desirably transparent to incident light, but may be colored in some cases.

First Embodiment

Figure 1B:
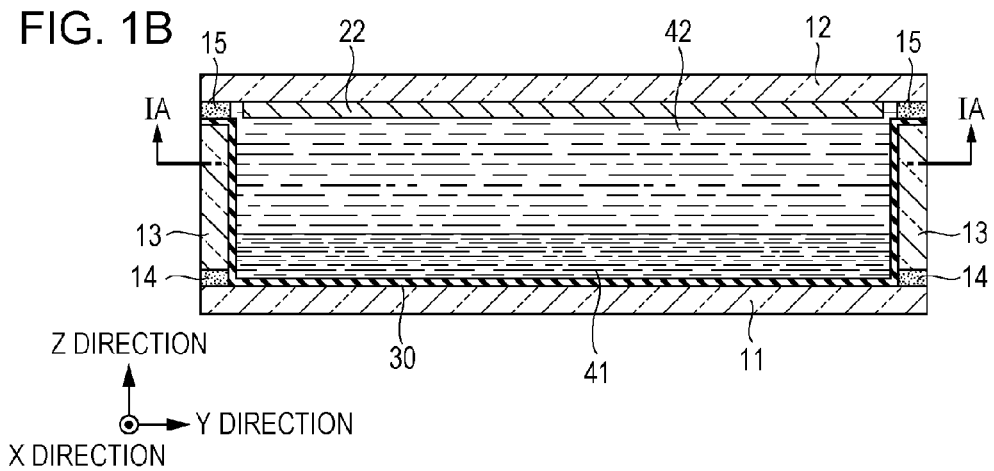
FIG. 1B is a schematic cross-sectional view of the optical device, taken along the line IB-IB in FIG. 1A.
Figure 1C:
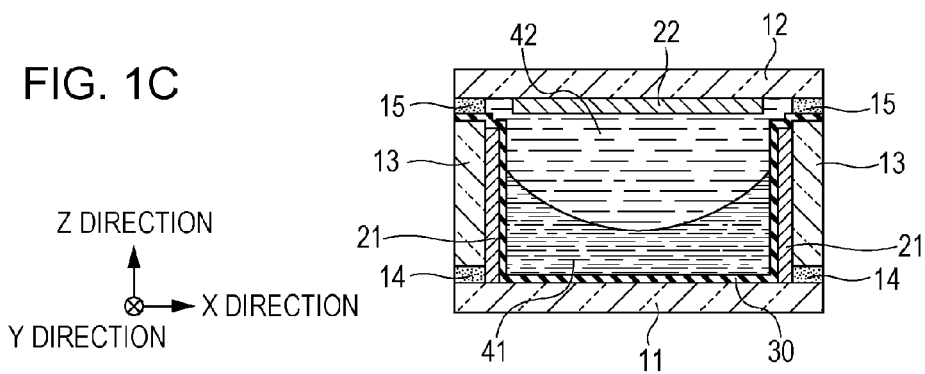
FIG. 1C is a schematic cross-sectional view of the optical device, taken along the line IC-IC in FIG. 1A.
Figure 3A:
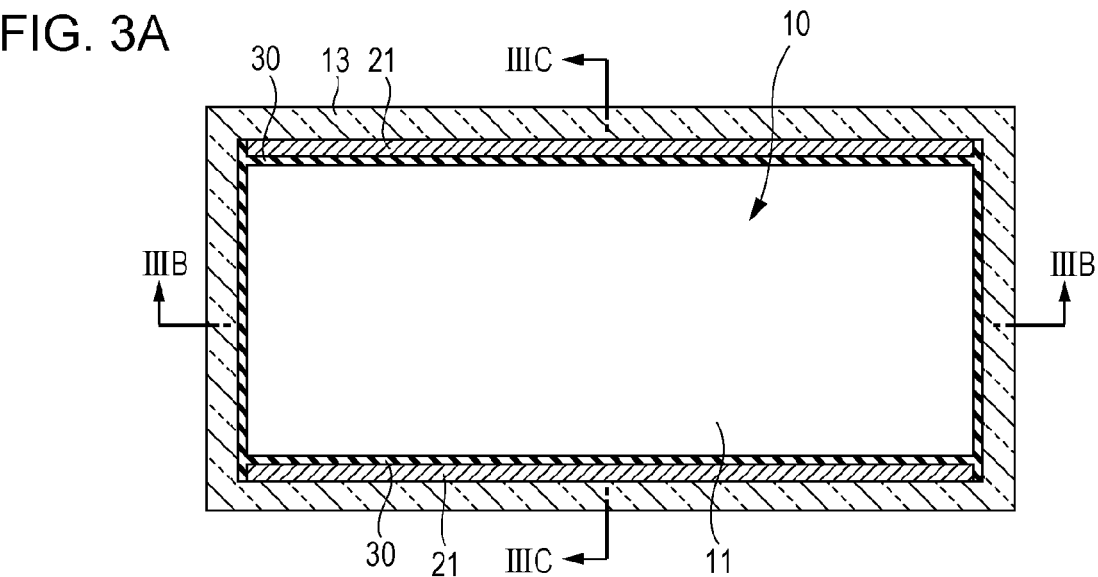
FIG. 3A is a schematic cross-sectional view of a housing according to the first embodiment, taken along the line IIIA-IIIA in FIG. 3B.
Figure 3B:
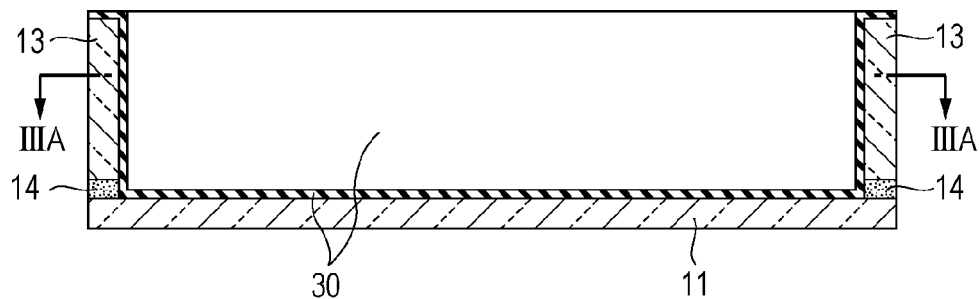
FIG. 3B is a schematic cross-sectional view of the housing, taken along the line IIIB-IIIB in FIG. 3A.
Figure 3C:
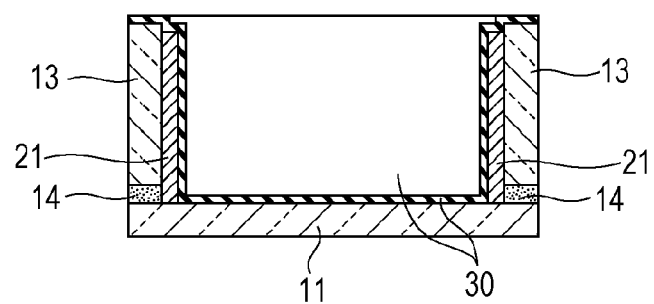
FIG. 3C is a schematic cross-sectional view of the housing, taken along the line IIIC-IIIC in FIG. 3A.

A first embodiment relates to an optical device and a housing. An optical device according to the first embodiment constitutes a kind of cylindrical liquid lens, and the cylindrical lens functions as a convex lens. FIG. 1A is a schematic cross-sectional view of an optical device according to the first embodiment, taken along the line IA-IA in FIG. 1B. FIG. 1B is a schematic cross-sectional view of the optical device, taken along the line IB-IB in FIG. 1A. FIG. 1C is a schematic cross-sectional view of the optical device, taken along the line IC-IC in FIG. 1A. The cross-sectional shape of the liquid lens, taken along the X-Z plane, is a schematic shape and is therefore different from the actual shape. FIG. 3A is a schematic cross-sectional view of a housing according to the first embodiment, taken along the line IIIA-IIIA in FIG. 3B. FIG. 3B is a schematic cross-sectional view of the housing, taken along the line IIIB-IIIB in FIG. 3A. FIG. 3C is a schematic cross-sectional view of the housing, taken along the line IIIC-IIIC in FIG. 3A.

Figure 2A:
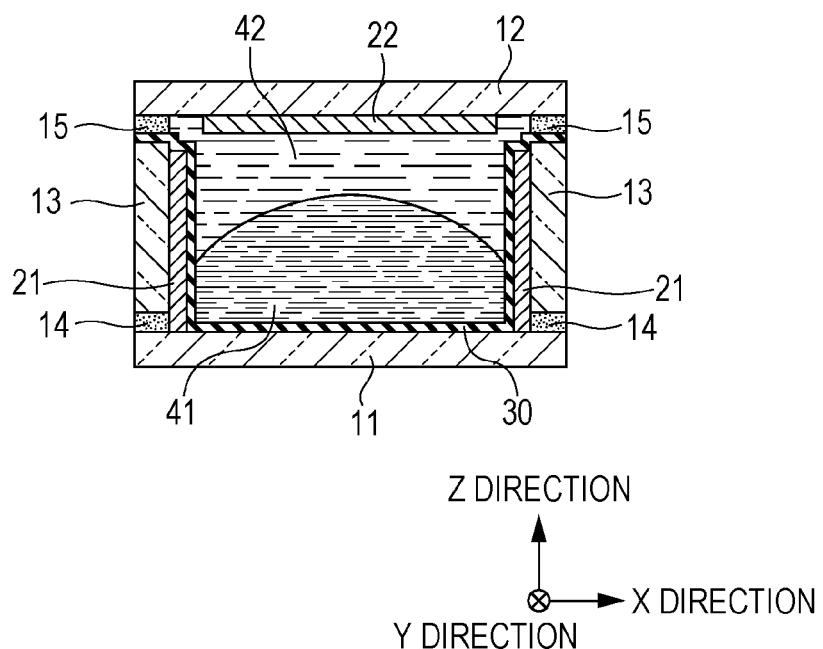
FIGS. 2A and 2B are each a schematic cross-sectional view of the optical device, taken along the line IC-IC in FIG. 1A, and illustrating the principle of a liquid lens.
Figure 2B:
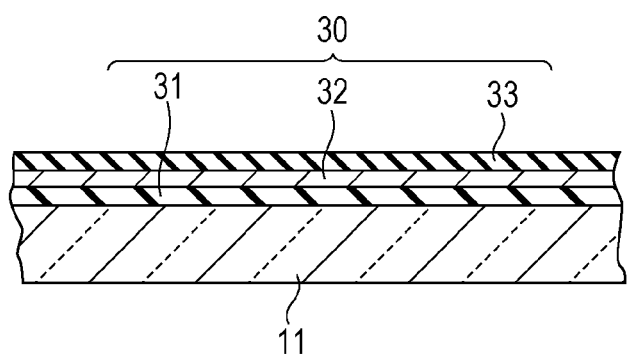

The optical device according to the first embodiment includes (a) a first substrate 11 which is transparent to incident light, (b) a second substrate 12 which is transparent to incident light and which opposes the first substrate 11, and (c) a frame member 13 which connects the first substrate 11 to the second substrate 12. A lens chamber 10 surrounded by the first substrate 11, the second substrate 12, and the frame member 13 is filled with a first liquid 41 and a second liquid 42 which constitute a liquid lens. A region composed of an inorganic material and a region composed of an organic material coexist in the inner surface of the first substrate 11 and the inner surface of the frame member 13 facing the lens chamber 10. A first insulating layer 31 composed of an inorganic material, an adhesion layer 32 composed of an organic material, and a second insulating layer 33 composed of an organic material are stacked in that order on the inner surface of the first substrate 11 and the inner surface of the frame member 13 facing the lens chamber 10. In the drawings, in some cases, a laminated structure including the first insulating layer 31, the adhesion layer 32, and the second insulating layer 33 is denoted by reference numeral 30 and shown in as one layer. FIG. 2B is a partial cross-sectional view of the laminated structure 30.

The housing according to the first embodiment includes a substrate 11 and a frame member 13 bonded to the substrate 11 by an adhesive layer 14 composed of an organic material. A region composed of an inorganic material and a region composed of an organic material coexist in the inner surface of the substrate 11 and the inner surface of the frame member 13 facing the inside of the housing. A first insulating layer 31 composed of an inorganic material, an adhesion layer 32 composed of an organic material, and a second insulating layer 33 composed of an organic material are stacked in that order on the inner surface of the substrate 11 and the inner surface of the frame member 13 facing the inside of the housing.

In the optical device according to the first embodiment, a first electrode 21 composed of an inorganic material is provided at least on a portion of the inner surface of the frame member 13, the first electrode 21 constituting the region composed of an inorganic material, and a second electrode 22 composed of an inorganic material is provided on a portion of the inner surface of the second substrate 12 facing the lens chamber 10. In the first embodiment, the first electrode 21 composed of an inorganic material is provided on a portion of the inner surface of the frame member 13, and the remainder of the inner surface of the frame member 13 constitutes the region composed of an organic material. The lens chamber (housing) 10 has a rectangular outer shape, and is filled with the first liquid 41 and the second liquid 42 which constitute a liquid lens as a cylindrical lens, the axis of which is oriented in the Y direction. Light enters the first substrate 11 and exits from the second substrate 12.

Specifically, in the first embodiment, the organic material constituting the second insulating layer 33 is a paraxylylene-based polymer represented by any of structural formulae (1) to (5) described above. Furthermore, the inorganic material constituting the first insulating layer 31 is $SiO_2$. Furthermore, the organic material constituting the adhesion layer 32 is a silane coupling agent, specifically, 3-methacryloxypropyl trimethoxysilane or 3-aminopropyl triethoxysilane. The first substrate 11 and the frame member 13 are bonded to each other by the adhesive layer 14 composed of an organic material (specifically, an epoxy adhesive), and the adhesive layer 14 has a portion facing the lens chamber (housing) 10. Furthermore, the second electrode 21 is composed of ITO, and the first electrode 21 is composed of a metal, such as gold, aluminum, copper, or silver. The first substrate 11, the second substrate 12, and the frame member 13 are composed of a plastic that is transparent to incident light, specifically, a cyclo-olefin polymer (COP) resin.

In the first embodiment or the second embodiment which will be described later, the first liquid 41 and the second liquid 42 are insoluble in and immiscible with each other, and the interface between the first liquid 41 and the second liquid 42 constitutes a lens surface. The first liquid 41 has an insulating property, and the second liquid 42 has conductivity. The second electrode 22 is in contact with the second liquid 42, and the first electrode 21 is in contact with the first liquid 41 and the second liquid 42 with the second insulating layer 33 therebetween. The first liquid 41 having an insulating property is composed of silicone oil TSF437 manufactured by Momentive Performance Materials Japan LLC (formerly GE Toshiba Silicone, Ltd.) with a density of 1.02 $g/cm^3$ and a refractive index of 1.49. Meanwhile, the second liquid 42 having conductivity is composed of an aqueous lithium chloride solution with a density of 1.06 $g/cm^3$ and a refractive index of 1.34. At least a portion of the second insulating layer 33 at which the interface between first liquid 41 and the second liquid 42 is located has water repellency.

The first electrode 21 and the second electrode 22 are configured to be connected to a lens controlling unit through a connection (not shown) so that a desired voltage can be applied. In the state shown in FIGS. 1A to 1C, no voltage is applied to the first electrode 21 and the second electrode 22. When appropriate voltages are applied to the first electrode 21 and the second electrode 22, the lens surface constituted by the interface between the first liquid 41 and the second liquid 42 changes from the state in which the lens surface is convex downward as shown in FIG. 1C to the state in which the lens surface is convex upward as shown in FIG. 2A. The change in the state of the lens surface depends on the voltages applied to the electrodes 21 and 22 (refer to the equation (A)). In the example shown in FIG. 2A, the same voltage is applied to the first electrodes 21 located at both sides of the first liquid 41 and the second liquid 42. Therefore, the cross-sectional shape of the liquid lens formed in the lens chamber, taken along the X-Z plane, is symmetric with respect to the central axis in the normal direction of the lens chamber 10. In the case where different voltages are applied to the first electrodes 21 located at both sides, the cross-sectional shape of the liquid lens formed in the lens chamber, taken along the X-Z plane, is asymmetric with respect to the central axis in the normal direction of the lens chamber 10. Moreover, the optical power of the lens formed in the lens chamber 10 can be changed depending on the difference in the potential between the first electrode 21 and the second electrode 22. When the lens exhibits its optical power, the optical power of the lens in the Y-Z plane (or in a plane parallel to the Y-Z plane) is substantially zero, and the optical power of the lens in the X-Z plane is a finite value. The basic operation of the optical device according to the first embodiment described above is the same in an optical device according to the second embodiment which will be described later.

The optical device or the housing according to the first embodiment can be fabricated by the method described below.

A first substrate 11 and a frame member 13 are prepared. A first electrode 21 is formed in advance in a predetermined region in the surface of the frame member 13, for example, using vacuum vapor deposition. The first substrate 11 and the frame member 13 are bonded to each other using an epoxy adhesive. In some cases, the assembly including the first substrate 11 and the frame member 13 may be referred to as the "lens chamber assembly". In this state, a region composed of an inorganic material and a region composed of an organic material coexist in the inner surface of the first substrate 11 and the inner surface of the frame member 13 facing the lens chamber (housing) 10. Specifically, the inner surface of the first substrate 11 facing the lens chamber (housing) 10 includes a region composed of an organic material (specifically, a COP resin). Meanwhile, a region composed of an inorganic material (the region occupied by the first electrode 21) and a region composed of an organic material (the region other than the above) coexist in the inner surface of the frame member 13 facing the lens chamber (housing). Furthermore, a portion (end) of the adhesive layer 14 is exposed to the lens chamber (housing) 10.

Then, a first insulating layer 31 composed of $SiO_2$ with an average thickness of 0.2 μm is formed (deposited) by sputtering on the inner surface of the first substrate 11 and the inner surface of the frame member 13 facing the lens chamber (housing) 10. In sputtering, the energy of sputtered particles is high, and therefore, deposition can be performed with good adhesion on both the organic material and the inorganic material. Then, by immersion in a solution containing 94% by weight of isopropyl alcohol, 5% by weight of water, and 1% by weight of a silane coupling agent (specifically, 3-methacryloxypropyl trimethoxysilane) for 10 minutes, followed by drying at 65° C. for 30 minutes, washing with water, and drying again at 65° C. for 30 minutes, or by application of an aqueous solution of a silane coupling agent, followed by drying, washing with water, and drying again, an adhesion layer 32 composed of an organic material can be formed (deposited) on the first insulating layer 31.

Next, the lens chamber assembly is placed in a vapor deposition chamber, and using a monomer gas, polymerization is performed at the position where the monomer gas is in contact with the adhesion layer 32 to form a second insulating layer 33 with an average thickness of 3 μm. As a result, it is possible to obtain a conformal second insulating layer 33 which is pinhole-free even in microscopic regions. Thus, a housing according to the first embodiment can be obtained.

Then, the lens chamber assembly is removed from the vapor deposition chamber. A first liquid 41 and a second liquid 42 are placed in the lens chamber 10, and the entire assembly is sealed with a second substrate 12 using an adhesive 15. Thus, an optical device (liquid lens) according to the first embodiment can be obtained. Alternatively, a method may be used in which, after the lens chamber 10 is sealed with a second substrate 12 using an adhesive 15, under reduced pressure in the lens chamber 10, a first liquid 41 is poured in the lens chamber 10 through an inlet (not shown) provided in the frame member 13, followed by pouring of a second liquid 42. In this process, the second liquid 42 is poured so as to form an interface with the first liquid 41, and a portion of the second liquid 42 is discharged from an outlet (not shown). Finally, the inlet and the outlet are sealed, and the electrodes are connected to the lens controlling unit. Thereby, an optical device (liquid lens) can be completed.

In order to evaluate adhesion, samples were prepared by forming an adhesion layer composed of the silane coupling agent described above on each of a glass substrate, a plastic substrate, a plastic substrate (composed of a COP resin) provided with a first insulating layer composed of $SiO_2$. Samples not provided with the adhesion layer were also prepared. (In Table below, those provided with the adhesion layer are expressed as "treated", and those not provided with the adhesion layer were expressed as "not treated".) A second insulating layer composed of the paraxylylene-based polymer described above was formed on each of the samples. A tape adhesion test was carried out. The results thereof are shown in Table. In the tape adhesion test, a grid pattern with squares of 2 mm×2 mm was cut, with a cutter, into the deposited second insulating layer, and a tape was applied thereto. When the tape was removed, the second insulating layer was checked to find how many squares in the second insulating layer remained without being peeled off. Thereby, the adhesion of the layer was evaluated. The number of squares was set at 5×5=25.

TABLE

|  | Not treated | Treated |
| --- | --- | --- |
| Glass substrate | 0/25 | 25/25 |
| Plastic substrate | 0/25 | 0/25 |
| First insulating layer | 0/25 | 25/25 |

As a result of the tape adhesion test, in the case where the second insulating layer composed of the paraxylylene-based polymer was formed on the sample not provided with the adhesion layer composed of the silane coupling agent (not treated), the second insulating layer was peeled off from any of the bases. In the case where the second insulating layer composed of the paraxylylene-based polymer was formed on the sample provided with the adhesion layer composed of the silane coupling agent (treated), the second insulating layer was not peeled off from the base composed of an inorganic material (the glass substrate or the first insulating layer). However, in the case of the base composed of an organic material (the plastic substrate), the second insulating layer was peeled off. As described above, by treating the base with the silane coupling agent after the first insulating layer composed of $SiO_2$ was formed on the surface of the plastic substrate, it was possible to obtain adhesion equivalent to that of the glass substrate even in the plastic substrate.

Furthermore, three optical devices were fabricated as in the first embodiment except that the first insulating layer was not formed (Comparative Example 1). The three optical devices of Comparative Example 1 and three optical devices according to the first embodiment were subjected to a heat cycle test. In the heat cycle test, 50 heat cycles were conducted, each cycle including 2 hours at −40° C. and 2 hours at 70° C. As a result, in all of the optical devices of Comparative Example 1, separation of the second insulating layer was observed. In contrast, in all of the optical devices according to the first embodiment, separation of the second insulating layer was not observed.

According to the first embodiment, on the inner surface of a first substrate 11 and the inner surface of a frame member 13 which face a lens chamber and in which a region composed of an inorganic material and a region composed of an organic material coexist (base), or on the inner surface of a substrate 11 and the inner surface of a frame member 13 which face the inside of a housing and in which a region composed of an inorganic material and a region composed of an organic material coexist (base), a first insulating layer 31 composed of an inorganic material and an adhesion layer 32 composed of an organic material are stacked, and a second insulating layer 33 composed of an organic material is disposed on the adhesion layer 32. In such a manner, the first insulating layer 31 composed of an inorganic material having good adhesion to the base is formed on the base, the adhesion layer 32 composed of an organic material having a good adhesive effect on the first insulating layer 31 is formed thereon, and the second insulating layer 33 composed of an organic material exhibiting good adhesion in the presence of the adhesion layer 32 is formed. Consequently, it is possible to obtain a second insulating layer 33 having high adhesion to the base constituted by a region composed of an inorganic material and a region composed of an organic material. Therefore, it is possible to reliably prevent the second insulating layer 33 from being separated from the first substrate 11 or the frame member 13.

Second Embodiment

Figure 4:
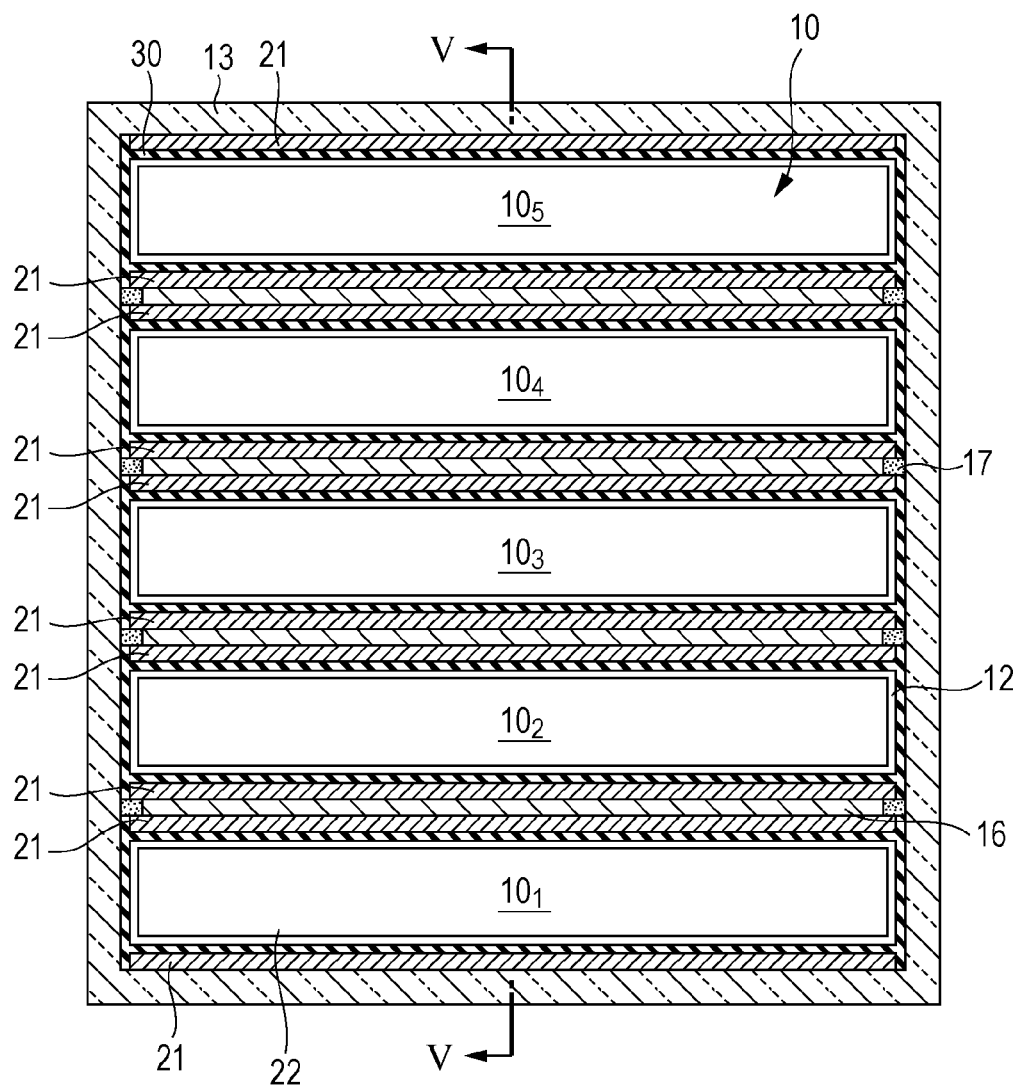
FIG. 4 is a partial schematic cross-sectional view of a lens chamber constituting an optical device according to a second embodiment, taken along the line IV-IV in FIG. 5A.
Figure 5A:
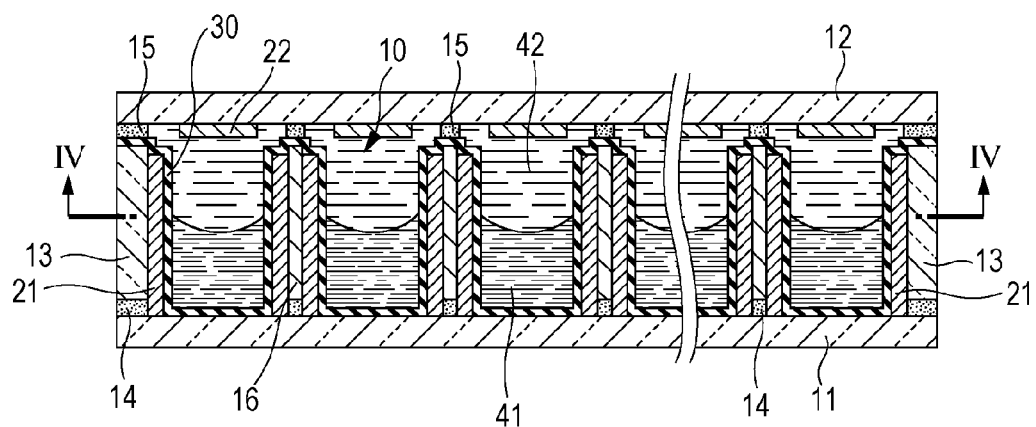
FIG. 5A is a schematic cross-sectional view of a lens chamber constituting an optical device according to the second embodiment.

A second embodiment is a modification of the first embodiment. FIG. 4 is a partial schematic cross-sectional view of a lens chamber constituting an optical device according to the second embodiment, taken along the line IV-IV in FIG. 5A. FIG. 5A is a schematic cross-sectional view of a lens chamber constituting an optical device according to the second embodiment, taken along the line V-V in FIG. 4. In the first embodiment, an optical device (liquid lens) is configured to include one lens chamber. In the second embodiment, an optical device (liquid lens) is configured to include a plurality of lens chambers. That is, wall members 16 are arranged in a lens chamber 10 to divide the lens chamber 10 into a plurality of regions (sections). In an example shown in FIG. 4, lens chambers 10 ($10_1$, $10_2$, $10_3$, $10_4$, and $10_5$) are placed side by side, merely for the purpose of simplification of the drawing. The bottom surface of each wall member 16 extends to the first substrate 11, and the top surface of each wall member 16 extends to the second substrate 12. The wall members 16 are fixed to the frame member 13 with an adhesive 17. Each of the lens chambers 10 ($10_1$, $10_2$, $10_3$, $10_4$, and $10_5$) has substantially the same configuration and structure as those of the lens chamber 10 according to the first embodiment described above. In the example shown, a second electrode 22 is provided for each lens chamber. However, one second electrode 22 may be provided on the inner surface of the second substrate 12.

Figure 5B:
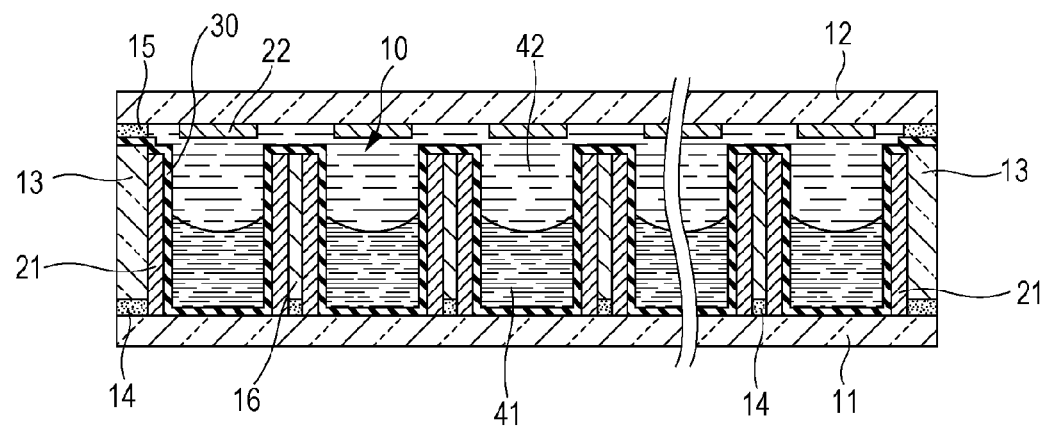
FIG. 5B is a schematic cross-sectional view of a lens chamber constituting an optical device according to a modification example of the second embodiment, taken along the line V-V in FIG. 4.
Figure 5B:
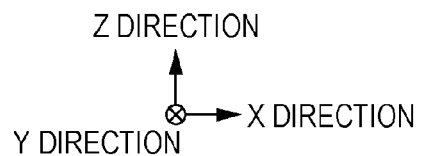
Figure 6A:
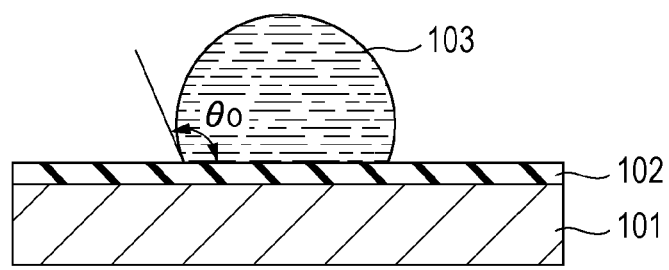
FIGS. 6A and 6B are views illustrating the principle of electrocapillarity.
Figure 6B:
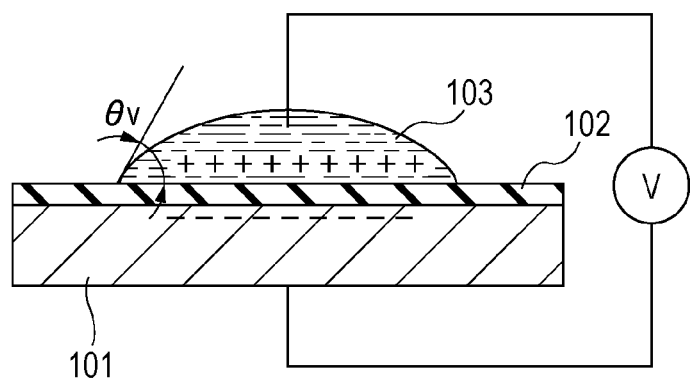

As shown in FIG. 5B, a configuration may be used in which the bottom surface of each wall member 16 extends to the first substrate 11, and there is a gap between the top surface of the wall member 16 and the second substrate 12. Alternatively, a configuration may be used in which there is a gap between the bottom surface of each wall member 16 and the first substrate 11, and the top surface of the wall member 16 extends to the second substrate 12. Alternatively, a configuration may be used in which there is a gap between the bottom surface of each wall member 16 and the first substrate 11, and there is a gap between the top surface of the wall member 16 and the second substrate 12.

The present application has been described above on the basis of the preferred embodiments. However, it is to be understood that the present application is not limited to the embodiments. The configurations and structures of the optical device and the housing described in the embodiments are merely examples and can be changed appropriately. Furthermore, the configurations, structures, and arrangements of the first electrode and the second electrode can be appropriately changed depending on the properties (conductivity and insulating property) of the liquid in contact with the electrodes directly or with an insulating layer therebetween.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An optical device comprising:
   (a) a first substrate which is transparent to incident light;
   (b) a second substrate which is transparent to incident light and which opposes the first substrate; and
   (c) a frame member which connects the first substrate to the second substrate,
   wherein a lens chamber surrounded by the first substrate, the second substrate, and the frame member is filled with a first liquid and a second liquid which constitute a liquid lens,
   a region composed of an inorganic material and a region composed of an organic material coexist in the inner surface of the first substrate and the inner surface of the frame member facing the lens chamber, and
   a first insulating layer composed of an inorganic material, an adhesion layer composed of an organic material, and a second insulating layer composed of an organic material are stacked in that order on the inner surface of the first substrate and the inner surface of the frame member facing the lens chamber.

2. The optical device according to claim 1, wherein the organic material constituting the second insulating layer includes a paraxylylene-based polymer.

3. The optical device according to claim 1, wherein the inorganic material constituting the first insulating layer includes $SiO_2$.

4. The optical device according to claim 1, wherein the organic material constituting the adhesion layer includes a silane coupling agent.

5. The optical device according to claim 1, wherein the first substrate and the frame member are bonded to each other by an adhesive layer composed of an organic material, and the adhesive layer has a portion facing the lens chamber.

6. The optical device according to claim 1, wherein a first electrode composed of an inorganic material is provided at least on a portion of the inner surface of the frame member, the first electrode constituting the region composed of an inorganic material, and a second electrode composed of an inorganic material is provided on a portion of the inner surface of the second substrate facing the lens chamber.

7. The optical device according to claim 6, wherein the remainder of the inner surface of the frame member constitutes the region composed of an organic material.

* * * * *